(12) United States Patent
Fay (10) Patent No.: US 10,680,802 B2
(45) Date of Patent: Jun. 9, 2020

(54) HIGH-RATE MULTI-BLOCK-LENGTH HASH FUNCTION BASED ON BLOCK CIPHERS

(71) Applicant: NXP B.V., Eindhoven (NL)

(72) Inventor: Bjorn Fay, Schleswig-Holstein (DE)

(73) Assignee: NXP B.V., Eindhoven (NL)

( * ) Notice: Subject to any disclaimer, the term of this patent is extended or adjusted under 35 U.S.C. 154(b) by 229 days.

(21) Appl. No.: 15/994,656

(22) Filed: May 31, 2018

(65) Prior Publication Data

US 2019/0372752 A1 Dec. 5, 2019

(51) Int. Cl.
*H04L 9/06* (2006.01)

(52) U.S. Cl.
CPC ............ *H04L 9/0618* (2013.01); *H04L 9/065* (2013.01); *H04L 9/0643* (2013.01)

(58) Field of Classification Search
CPC ...... H04L 9/0618; H04L 9/065; H04L 9/0643
See application file for complete search history.

(56) References Cited

U.S. PATENT DOCUMENTS

| 4,908,861 A | 3/1990 | Brachtl et al. | |
|---|---|---|---|
| 2010/0054461 A1* | 3/2010 | Ciet | H04L 9/002 380/29 |
| 2016/0105276 A1* | 4/2016 | Brumley | H04L 9/0618 380/28 |

FOREIGN PATENT DOCUMENTS

| FR | 2909498 A1 | 6/2008 |
|---|---|---|
| KR | 20080044150 A | 5/2008 |

OTHER PUBLICATIONS

B. Mennink: Optimal Collision Security in Double Block Length Hashing with Single Length Key, Dept. Electrical Engineering, ESAT/COSIC, KU Leuven, and IBBT, Belgium. 27 pages.

E. Fleischmann, et al.:Security of Cyclic Double Block Length Hash Functions including Abreast-DM, Bauhaus-University Weimar, Germany, 25 pages.

(Continued)

*Primary Examiner* — Huan V Doan (57) ABSTRACT

Various embodiments relate to a method of hashing a message M using a block cipher, including: producing N block cipher inputs by XORing message indices i, ... i+N−1 respectively with state values $S_0, \ldots S_{N-1}$, wherein N is an integer greater than 1; producing N block cipher keys by XORing N different blocks of message M and at least one of state values $S_0, \ldots S_{N-1}$ for each of the N block cipher keys; encrypting the N block cipher inputs using the respective N block cipher keys to produce N block cipher outputs; combining the N block cipher outputs with N block cipher inputs to produce N block cipher combined outputs $T_t$, for $t=0, \ldots, N-1$; calculating $Y_0=T_0$; calculating $Y_t=Y_{t-1} \oplus T_t$, for $t=1, \ldots, N-1$, calculating $S_{N-1}'=Y_{N-1}<<<a$, where a is a number of bits to rotate where $S_0', \ldots, S_{N-1}'$ are new state values; and calculating $S_t'=Y_t \oplus S_{N-1}'$, for $t=0, \ldots, N-2$.

14 Claims, 4 Drawing Sheets

(56) References Cited

OTHER PUBLICATIONS

A. J. Menezes, et al.: Handbook of applied cryptography. pp. 340-344.
J. Lee, et al.: MJH: A Faster Alternative to MDC-2, 24 pages.
L. R. Knudsen, et al.: Some Attacks Against a Double Length Hash Proposal, B. Roy (Ed.): ASIACRYPT 2005, LNCS 3788, pp. 462-473, 2005.
S.Hirose: Some Plausible Constructions of Double-Block-Length Hash Functions, 24 pages.
S. Lucks: A Collision-Resistant Rate-1 Double-Block-Length Hash Function, 14 pages.
T. Payerin, et al.: Combining Compression Functions and Block Cipher-Based Hash Functions, 17 pages.
X. Lai, et al.: Hash Functions Based on Block Ciphers, Reprint of pp. 55-70 in Advances in Cryptology-EUROCRYPT'92 Proceedings, LNCS 658, Springer-Verlag, 1993.
Y. Luo: A Proposal for High Rate Double-Block-Length Hash Functions, The 2016 3rd International Conference on Systems and Informatics (ICSAI 2016), pp. 797- 802.
Y. Luo, et al.: Attacks on a Double Length Blockcipher-based Hash Proposal, 9 pages.
Wu, Wenling et al.; "LBlock: A Lightweight Block Cipher," International Conference on Applied Cryptography and Network Security, ACNS 2011, Nerja, Spain, Jun. 7-10, 2011. Proceedings (pp. 327-344).

\* cited by examiner

HIGH-RATE MULTI-BLOCK-LENGTH HASH FUNCTION BASED ON BLOCK CIPHERS

TECHNICAL FIELD

Various exemplary embodiments disclosed herein relate generally to high-rate multi-block-length hash function based upon block ciphers.

BACKGROUND

Various schemes have been developed for using block ciphers to implement hash functions. Such hash functions use the block ciphers as one of the building blocks for computing the hash of a message.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a method of hashing a message M using a block cipher, including: producing N block cipher inputs by XORing message indices i, ... i+N−1 respectively with state values $S_0, \ldots S_{N-1}$, wherein N is an integer greater than 1; producing N block cipher keys by XORing N different blocks of message M and at least one of state values $S_0, \ldots S_{N-1}$ for each of the N block cipher keys; encrypting the N block cipher inputs using the respective N block cipher keys to produce N block cipher outputs; combining the N block cipher outputs with N block cipher inputs to produce N block cipher combined outputs $T_t$, for $t=0, \ldots, N-1$; calculating $Y_0=T_0$; calculating $Y_t=Y_{t-1} \oplus T_t$, for $t=1, \ldots, N-1$, calculating $S_{N-1}'=Y_{N-1} \lll a$, where a is a number of bits to rotate where $S_0', \ldots, S_{N-1}'$ are new state values; and calculating $S_t'=Y_t \oplus S_{N-1}'$, for $t=0, \ldots, N-2$.

Various embodiments are described, wherein producing N block cipher keys by XORing N different blocks of message M and at least one of state values $S_0, \ldots S_{N-1}$ for each of the N block cipher keys, further includes: calculating $X_t = \bigoplus_{j=0}^{N-1} M_{r \cdot N+(t+\delta(j))\% \, N-j \cdot N} \cdot x^{\delta(j)} \mod p(x)$, for $t=0, \ldots, N-1$, where r is a round number and $\delta(j)=j \cdot (j-1)/2$ for $j>0$ and 0 for $j=0$ and $p(x)$ is a primitive polynomial of degree k where k is the size in bits of the key for the block cipher; calculating $\overline{S}_t = \bigoplus_{j \neq t} S_j$, zero padded to k bits, for $t=0, \ldots, N-1$; and calculating $X_t \oplus \overline{S}_t$ for $t=0, \ldots, N-1$ as the N block cipher keys.

Various embodiments are described, wherein $\delta(j)$ is 0, 0, 1, 3 for $j=0, \ldots, 3$ for $N \leq 4$.

Various embodiments are described, wherein $S_0, \ldots S_{N-1}$ are initialized to predefined values.

Various embodiments are described, wherein N=2, a first block cipher key is $M_i \oplus M_{i-2} \oplus S_1$, and a second block cipher key is $M_{i+1} \oplus M_{i-1} \oplus S_0$.

Various embodiments are described, wherein N=3, a first block cipher key is $M_i \oplus M_{i-3} \oplus x \cdot M_{i-5} \oplus S_1 \oplus S_2$, and a second block cipher key is $M_{i+1} \oplus M_{i-2} \oplus x \cdot M_{i-4} \oplus S_0 \oplus S_2$, a third block cipher key is $M_{i+2} \oplus M_{i-1} \oplus x \cdot M_{i-6} \oplus S_0 \oplus S_1$.

Various embodiments are described, wherein N=4, a first block cipher key is $M_i \oplus M_{i-4} \oplus x \cdot M_{i-7} \oplus x^3 \cdot M_{i-9} \oplus S_1 \oplus S_2 \oplus S_3$, a second block cipher key is $M_{i+1} M_{i-3} \oplus x \cdot M_{i-6} \oplus x^3 \cdot M_{i-12} \oplus S_0 \oplus S_2 \oplus S_3$, a third block cipher key is $M_{i+2} \oplus M_{i-2} \oplus x \cdot M_{i-5} \oplus x^3 \cdot M_{i-11} \oplus S_0 \oplus S_1 \oplus S_3$, and a fourth block cipher key is $M_{i+3} \oplus M_{i-1} \oplus x \cdot M_{i-8} \oplus x^3 \cdot M_{i-10} \oplus S_0 \oplus S_1 \oplus S_2$.

Further various embodiments relate to a method of hashing a message M using a block cipher, including: calculating $X_t = \bigoplus_{j=0}^{N-1} M_{r \cdot N+(t+\delta(j))\% \, N-j \cdot N} \cdot x^{\delta(j)} \mod p(x)$, for $t=0, \ldots, N-1$, where $M_{r \cdot N+(t+\delta(j))\% \, N-j \cdot N}$ is a block in the message M, N is an integer greater than 1, r is a round number, $\delta(j)=j \cdot (j-1)/2$ for $j>0$ and 0 for $j=0$, and $p(x)$ is a primitive polynomial of degree k where k is the size in bits of the key for the block cipher; calculating $\overline{S}_t = \bigoplus_{j \neq t} S_j$, zero padded to k bits, for $t=0, \ldots, N-1$, where $S_j$ are state values $S_0, \ldots S_{N-1}$; calculating $T_t = E(X_t \oplus \overline{S}_t; S_t \oplus i) \oplus S_t \oplus i$, for $t=0, \ldots, N-1$ and $i=r \cdot N+t$ where $E(K; D)$ means encryption of a block D with key K using the block cipher; calculating $Y_0=T_0$; calculating $Y_t=Y_{t-1} \oplus T_t$, for $t=1, \ldots, N-1$; calculating $S_{N-1}'=Y_{N-1} \lll 1$, where $S_t'$ are new state values; and calculating $S_t'=Y_t \oplus S_{N-1}'$, for $t=0, \ldots, N-2$.

Various embodiments are described, wherein $S_0, \ldots S_{N-1}$ are initialized to predefined values.

Various embodiments are described, wherein calculating $T_t = E(X_t \oplus \overline{S}_t; S_t \oplus (i+2k-2) \oplus St \oplus (i+2k-2)$, for all $i \geq n-1$ when the last block of M is complete where n is the number of blocks in the message M.

Various embodiments are described, wherein calculating $T_t = E(X_t \oplus S_t \oplus \overline{S}_t; S_t \oplus (i+2k-1) \oplus St \oplus (i+2k-1)$, for all $i \geq n-1$ when the last block of M is incomplete where n is the number of blocks in the message M.

Further various embodiments relate to a non-transitory machine-readable storage medium encoded with instructions for hashing a message M using a block cipher, the non-transitory machine-readable storage medium including: instructions for producing N block cipher inputs by XORing message indices i, ... i+N−1 respectively with state values $S_0, \ldots S_{N-1}$, wherein N is an integer greater than 1; instructions for producing N block cipher keys by XORing N different blocks of message M and at least one of state values $S_0, \ldots S_{N-1}$ for each of the N block cipher keys; instructions for encrypting the N block cipher inputs using the respective N block cipher keys to produce N block cipher outputs; instructions for combining the N block cipher outputs with N block cipher inputs to produce N block cipher combined outputs $T_t$, for $t=0, \ldots, N-1$; instructions for calculating $Y_0=T_0$; instructions for calculating $Y_t=Y_{t-1} \oplus T_t$, for $t=1, \ldots, N-1$, instructions for calculating $S_{N-1}'=Y_{N-1} \lll a$, where a is a number of bits to rotate where $S_0', \ldots, S_{N-1}'$ are new state values; and instructions for calculating $S_t'=Y_t \oplus S_{N-1}'$, for $t=0, \ldots, N-2$.

Various embodiments are described, wherein producing N block cipher keys by XORing N different blocks of message M and at least one of state values $S_0, \ldots S_{N-1}$ for each of the N block cipher keys, further includes: instructions for calculating $X_t = \bigoplus_{j=0}^{N-1} M = _{r \cdot N+(t+\delta(j))\% \, N-j \cdot N} \cdot x^{\delta(j)} \mod p(x)$, for $t=0, \ldots, N-1$, where r is a round number and $\delta(j)=j \cdot (j-1)/2$ for $j>0$ and 0 for $j=0$ and $p(x)$ is a primitive polynomial of degree k where k is the size in bits of the key for the block cipher; calculating $\overline{S}_t = \bigoplus_{j \neq t} S_j$, zero padded to k bits, for $t=0, \ldots, N-1$; and calculating $X_t \oplus \overline{S}_t$ for $t=0, \ldots, N-1$ as the N block cipher keys.

Various embodiments are described, wherein $\delta(j)$ is 0, 0, 1, 3 for $j=0, \ldots, 3$ for $N \leq 4$.

Various embodiments are described, wherein $S_0, \ldots S_{N-1}$ are initialized to predefined values.

Various embodiments are described, wherein N=2, a first block cipher key is $M_i \oplus M_{i-2} \oplus S_1$, and a second block cipher key is $M_{i+1} \oplus M_{i-1} \oplus S_0$.

Various embodiments are described, wherein N=3, a first block cipher key is $M_i \oplus M_{i-3} \oplus x \cdot M_{i-5} \oplus S_1 \oplus S_2$, and a second block cipher key is $M_{i+1} M_{i-2} \oplus x \cdot M_{i-4} \oplus S_0 \oplus S_2$, a third block cipher key is $M_{i+2} \oplus M_{i-1} \oplus x \cdot M_{i-6} \oplus S_0 \oplus S_1$.

Various embodiments are described, wherein N=4, a first block cipher key is $M_i \oplus M_{i-4} \oplus x \cdot M_{i-7} \oplus x^3 \cdot M_{i-9} \oplus S_1 \oplus S_2 \oplus S_3$, a second block cipher key is $M_{i+1} \oplus M_{i-3} \oplus x \cdot M_{i-6} \oplus x^3 \cdot M_{i-12} \oplus S_0 \oplus S_2 \oplus S_3$, a third block cipher key is $M_{i+2} \oplus M_{i-2} \oplus x \cdot M_{i-5} \oplus x^3 \cdot M_{i-11} \oplus S_0 \oplus S_1 \oplus S_3$, and a fourth block cipher key is $M_{i+3} \oplus M_{i-1} \oplus x \cdot M_{i-8} \oplus x^3 \cdot M_{i-10} \oplus S_0 \oplus S_1 \oplus S_2$.

Further various embodiments relate to a non-transitory machine-readable storage medium encoded with instructions for hashing a message M using a block cipher, the non-transitory machine-readable storage medium including: instructions for calculating $X_t = \oplus_{j=0}^{N-1} M_{r \cdot N + (t + \delta(j)) \% N - j \cdot N} \cdot x^{\delta(j)} \bmod p(x)$, for $t=0, \ldots, N-1$, where $M_{r \cdot N + (t + \delta(j)) \% N - j \cdot N}$ is a block in the message M, N is an integer greater than 1, r is a round number, $\delta(j) = j \cdot (j-1)/2$ for $j>0$ and 0 for $j=0$, and $p(x)$ is a primitive polynomial of degree k where k is the size in bits of the key for the block cipher; instructions for calculating $\overline{S}_t = \oplus_{j \neq t} S_j$, zero padded to k bits, for $t=0, \ldots, N-1$, where $S_j$ are state values $S_0, \ldots S_{N-1}$;

instructions for calculating $T_t = E(X_t \oplus \overline{S}_t; S_t \oplus i) \oplus S_t \oplus i$, for $t=0, \ldots, N-1$ and $i=r \cdot N+t$ where $E(K; D)$ means encryption of a block D with key K using the block cipher; instructions for calculating $Y_0 = T_0$; instructions for calculating $Y_t = Y_{t-1} \oplus T_t$, for $t=1, \ldots, N-1$; instructions for calculating $S_{N-1}' = Y_{N-1} <<< 1$, where $S_t'$ are new state values; and calculating $S_t' = Y_t \oplus S_{N-1}'$, for $t=0, \ldots, N-2$.

Various embodiments are described, wherein $S_0, \ldots S_{N-1}$ are initialized to predefined values.

Various embodiments are described, wherein calculating $T_t = E(X_t \oplus \overline{S}_t; S_t \oplus (i+2k-2)) \oplus St \oplus (i+2k-2)$, for all $i \geq n-1$ when the last block of M is complete where n is the number of blocks in the message M.

Various embodiments are described, wherein calculating $T_t = E(X_t \oplus \overline{S}_t; S_t \oplus (i+2k-1)) \oplus St \oplus (i+2k-1)$, for all $i \geq n-1$ when the last block of M is incomplete where n is the number of blocks in the message M.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Embodiments of a hash function based on a block cipher are described below that avoid the weaknesses of other block cipher hash functions such as MDC-2 and other double block length (DBL) hash functions. The embodiments described herein achieve rate R (further defined below) of 1 or higher instead of only rate 1/2 or less for key length equal to block length and twice for double key length.

The embodiments described below include the following features and technological advances. The hash function processes $N^2$ message blocks per round where each block in the N encryptions in different rounds are XORed with other blocks and used as the key for the block cipher and each block index is XORed to the state. In each round, N is the number of block encryptions that are computed. Further, the hash function connects the iterations via a Davies-Meyer like construction and almost cross wise XORing of all parts of the internal state. Also, the hash function uses a kind of extended/multiple/repeated Davies-Meyer construction. The hash function is twice as fast as MDC-2 and other DBL hash functions having only one Block operation per data block on average plus some small constant overhead. Finally, the rate is always 1 or higher, but constant overhead grows with N.

An embodiment of the NBOW (N Block One-Way) hash function is based on a block cipher, e.g., AES-128, with block size of b bits and key size of k bits. In each round N block encryptions are computed. The hash input block size is k bits, the input window size is $B = N \cdot k$ bits (i.e., the number of "new" message bits to be processed per round) and the output size is $s = N \cdot b$ bits. The rate R defined as number of message blocks per round, in terms of the block size b of the underlying block cipher (only for the definition of the rate), divided by N, the number of cipher calls per round, is $R = N \cdot (k/b)/N = k/b$.

As usual with hash functions, there is some pre-processing needed for padding the input message M. The NBOW hash functions uses a similar padding scheme as CMAC, that is if the last input block is complete (i.e., it has k bits) nothing must be done, otherwise the NBOW hash function appends a one-bit followed by as many zero-bits as necessary to fill the last input block until a multiple of k bits is reached.

Next, the NBOW hash function splits this padded input message into n k-bit blocks $M_i$ with $i=0, \ldots, n-1$. The processing of the input works in an iterated way and uses an internal state $S = (S_0, \ldots, S_{N-1})$ of $s = N \cdot b$ bits, which is initialized in the first round with $S_t = E(0; t)$ for $t = 0, \ldots, N-1$. In round $r = 0, 1, \ldots,$ $$\left\lceil \frac{n}{N} \right\rceil + N - 2$$

the old state S is combined with input blocks to a new state S'. The new state except for the last blocks is computed as $$X_t = \bigoplus_{j=0}^{N-1} M_{r \cdot N + (t + \delta(j))\ \%\ N - j \cdot N} \cdot x^{\delta(j)} \bmod p(x),$$

for $t = 0, \ldots, N - 1$, $$\overline{S}_t = \bigoplus_{j \neq t} S_j, \text{ zero padded to } k \text{ bits,}$$

for $t = 0, \ldots, N - 1$, $$T_t = E(X_t \oplus \overline{S}_t; S_t \oplus i) \oplus S_t \oplus i,$$

for $t = 0, \ldots, N - 1$ and $i = r \cdot N + t$ $Y_0 = T_0$, $Y_t = Y_{t-1} \oplus T_t$, for $t = 1, \ldots, N - 1$, $S'_{N-1} = Y_{N-1} << <1$, $S'_t = Y_t \oplus S'_{N-1}$, for $t = 0, \ldots, N - 2$.

Above E(K; D) means encryption of a block D with key K using the block cipher, "v<<<w" rotates v by w bits to the left and "⊕" is a bitwise XOR. Further i is represented as b-bit binary number and δ(j) is 0, 0, 1, 3, ..., j·(j−1)/2 for j=0, 1, 2, 3, .... The $\overline{S}_j$ values are zero padded to k bits as need, for example, when the size of the key is greater than the size of the input block. The multiplication $M \cdot x^{\delta(j)}$ mod p(x) is the modular multiplication over $GF(2^k)$ where p(x) is the lexicographical smallest primitive polynomial over GF(2) of degree k (a list with some examples are given below). For all i<0 and i≥n we set $M_i$=0. The output state values $S_t'$; become the input state to the next round.

For the last blocks, the computation is slightly different, depending if the last block $M_{n-1}$ was complete or needed some padding. If the last block $M_{n-1}$ was complete, the XOR with i is replaced by XOR with $i + 2^{k-2}$ for all i≥n−1. And if the last block was incomplete, the XOR with i is replaced by XOR with $i + 2^{k-1}$ for all i≥n−1.

The output h of the hash function (the so-called hash value) is simply the last state S and hence has a size of s=N·b bits. As can be seen this construction has a minimum size limit of $(2^{k-2} - (N-1) \cdot N) \cdot k$ bits for the input message, but should be sufficient for normal use cases.

Figure 1:
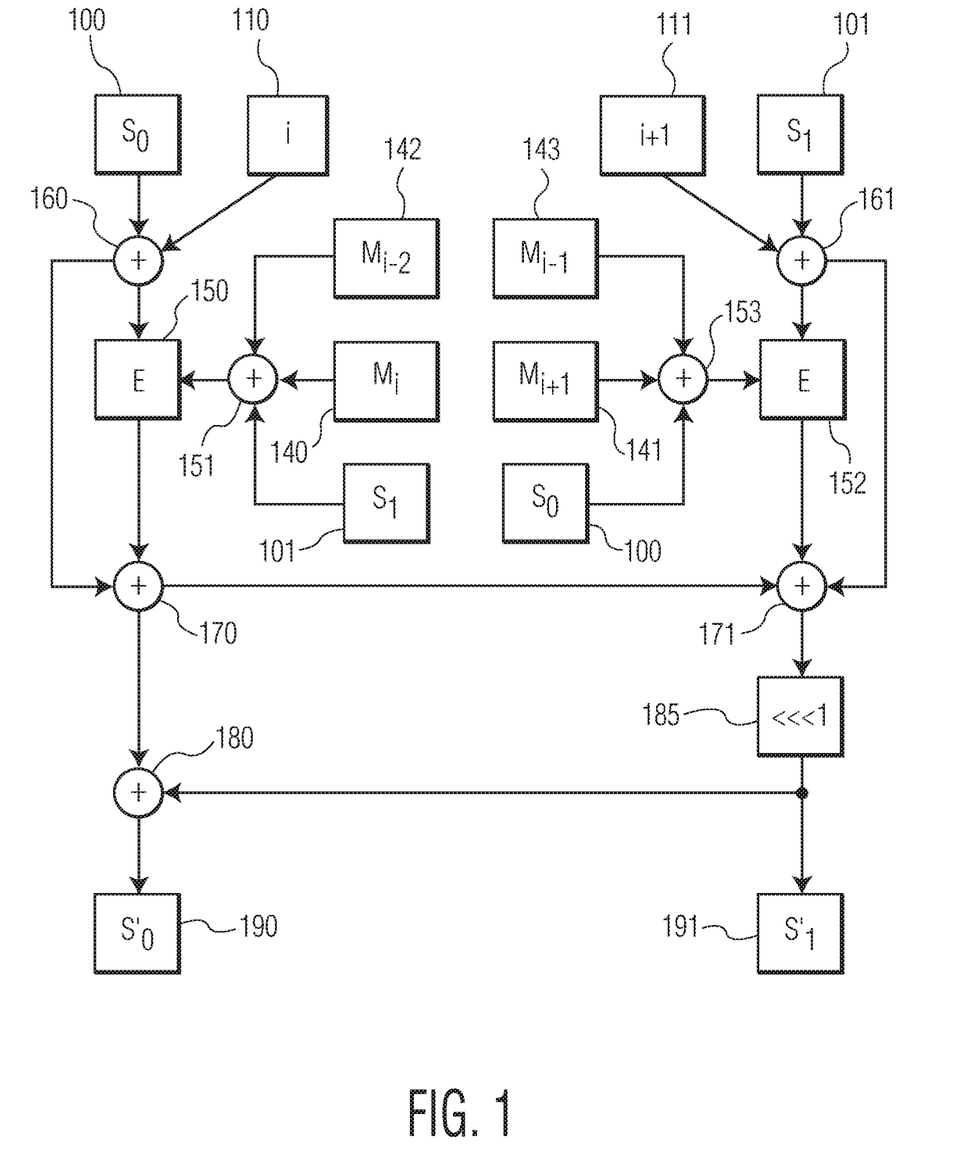
FIG. 1 illustrates the computation of the NBOW hash function for N=2, namely 2BOW.

FIG. 1 illustrates the computation of the NBOW hash function for N=2, namely 2BOW. Initially, an XOR 160 XORs the input state $S_0$ 100 and message index i 110, and XOR 161 XORs the input state $S_1$ 101 and message index i+1 111. The outputs of the XORs 160 and 161 provide the inputs to the block ciphers 150 and 152. An XOR 151 XORs block $M_i$ 140, block $M_{i-2}$ 142, and input state $S_1$ 101, which is then input as the key to the block cipher 150. Likewise, an XOR 153 XORs block $M_{i+1}$ 141, block $M_{i-1}$ 143, and input state $S_0$ 100, which is then input as the key to the block cipher 152. An XOR 170 XORs the output of the block cipher 150 with the output of the XOR 160. An XOR 171 XORs the output of the block cipher 152 with the output of the XOR 170 and with the output of the XOR 161. The output of XOR 171 is bit rotated by one bit 185 and becomes the new output state $S_1'$ 191. The XOR 180 XORs the new output state $S_1'$ 191 with the output of XOR 170 to produce the new output state $S_0'$ 190. The new output states $S_0'$ and $S_1'$ then become the inputs to the next round.

Figure 2:
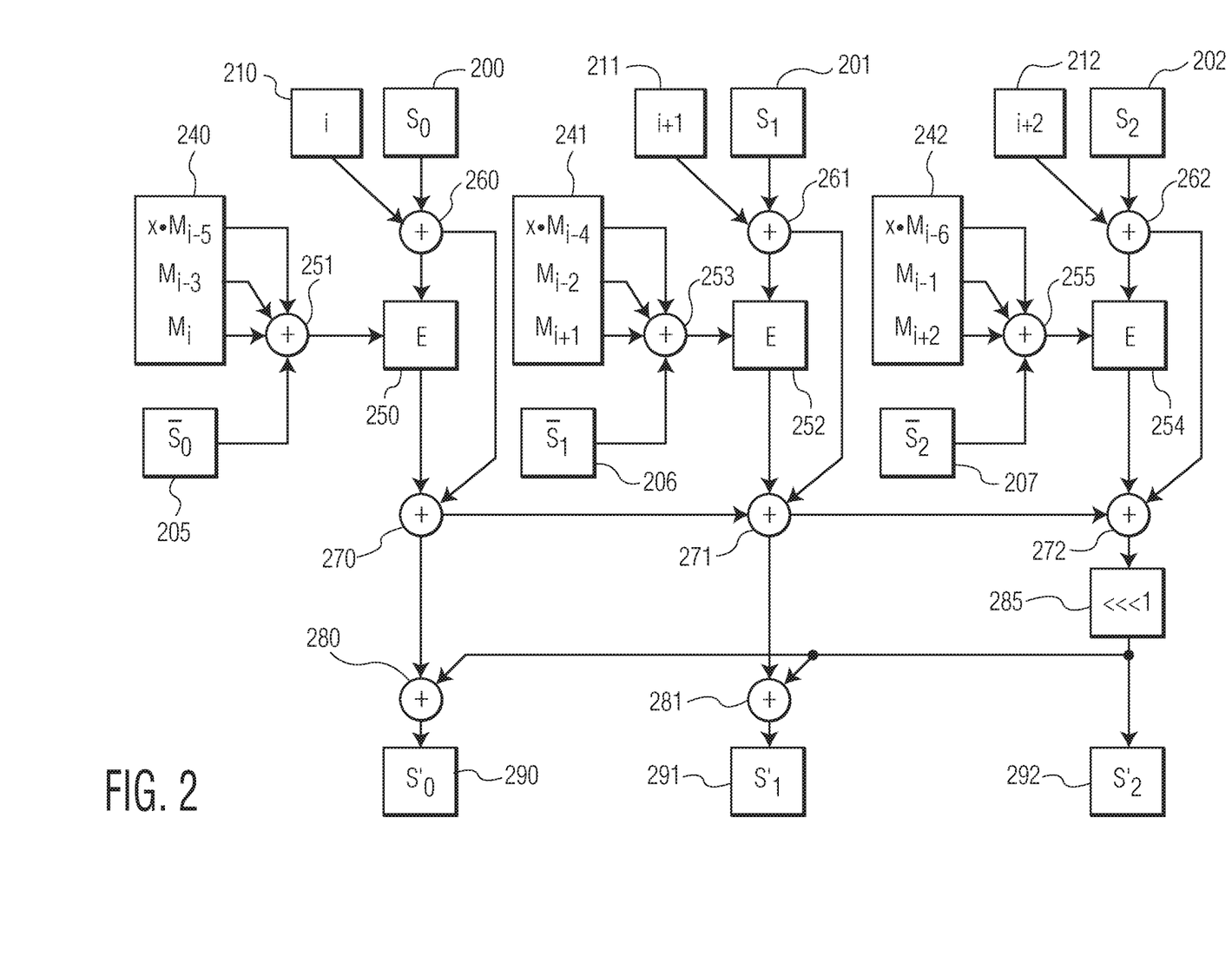
FIG. 2 illustrates the computation of the NBOW hash function for N=3, namely 3BOW.

FIG. 2 illustrates the computation of the NBOW hash function for N=3, namely 3BOW. Initially, an XOR 260 XORs the input state $S_0$ 200 and message index i 210, XOR 261 XORs the input state $S_1$ 201 and message index i+1 211, and XOR 262 XORs the input state $S_2$ 202 and message index i+2 212. The outputs of the XORs 260, 261, and 262 provide the inputs to the block ciphers 250, 252, and 254 respectively. An XOR 251 XORs block $M_i$ 240, block $M_{i-3}$ 240, $x \cdot M_{i-5}$ 240, and $\overline{S}_0$ 205, which is then input as the key to the block cipher 250. Likewise, an XOR 253 XORs block $M_{i+1}$ 241, block $M_{i-2}$ 241, $x \cdot M_{i-4}$ 241, and $\overline{S}_1$ 206, which is then input as the key to the block cipher 252. Further, an XOR 255 XORs block $M_{i+2}$ 242, block $M_{i-1}$ 242, $x \cdot M_{i-6}$ 242, and $\overline{S}_2$ 207, which is then input as the key to the block cipher 254. An XOR 270 XORs the output of the block cipher 250 with the output of the XOR 260. An XOR 271 XORs the output of the block cipher 252 with the output of the XOR 261 and the output of XOR 270. An XOR 272 XORs the output of the block cipher 254 with the output of the XOR 262 and the output of the XOR 271. The output of XOR 272 is bit rotated by one bit 285 and becomes the new output state $S_2'$ 292. The XOR 280 XORs the new output state $S_2'$ 292 with the output of XOR 270 to produce the new output state $S_0'$ 290. The XOR 281 XORs the new output state $S_2'$ 292 with the output of XOR 271 to produce the new output state $S_1'$ 291. The new output states $S_0'$, $S_1'$, and $S_2'$ then become the inputs to the next round.

Figure 3:
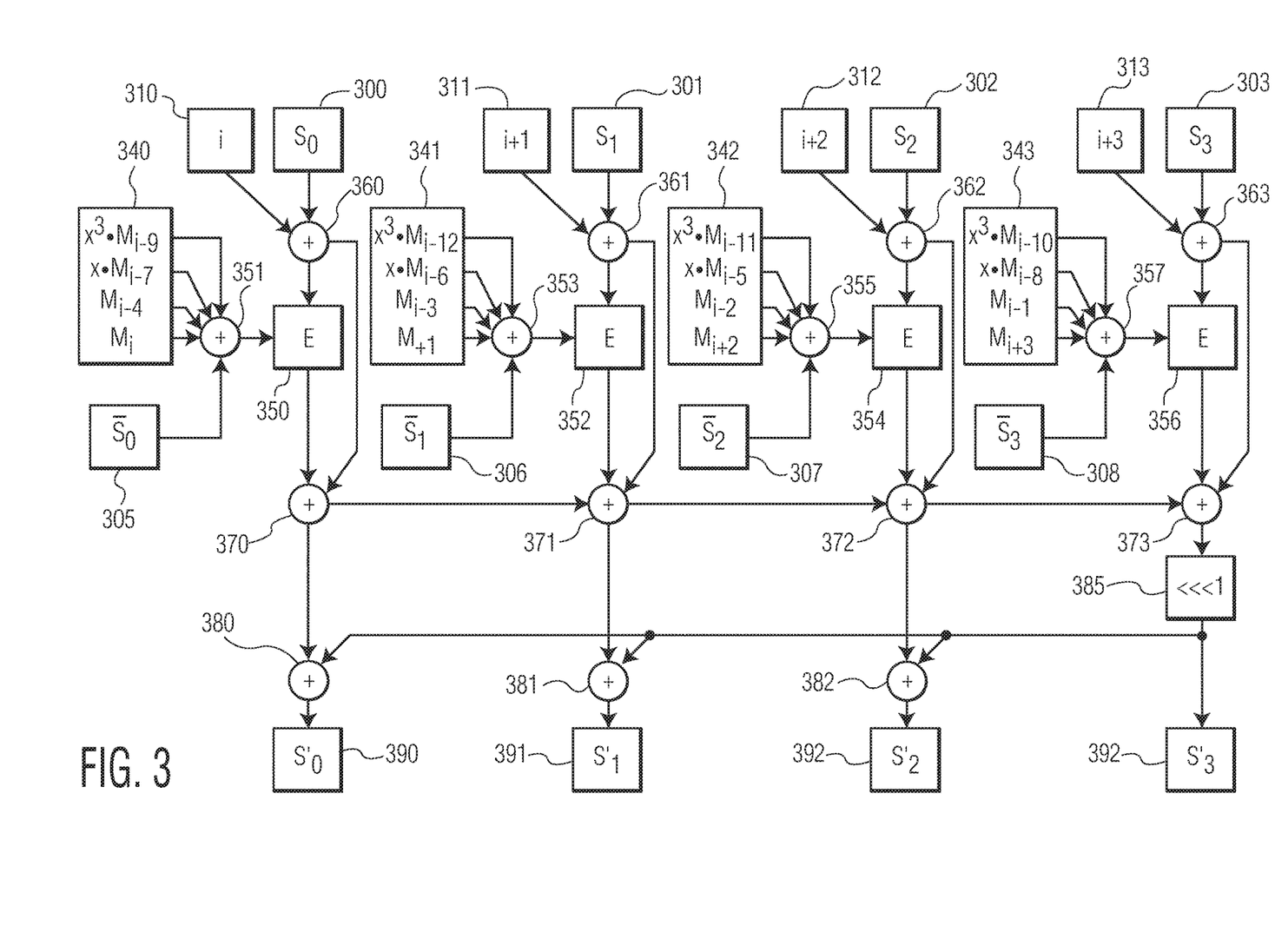
FIG. 3 illustrates the computation of the NBOW hash function for N=4, namely 4BOW.

FIG. 3 illustrates the computation of the NBOW hash function for N=4, namely 4BOW. Initially, an XOR 360 XORs the input state $S_0$ 300 and message index i 310, XOR 361 XORs the input state $S_1$ 301 and message index i+1 311, XOR 362 XORs the input state $S_2$ 302 and message index i+2 312, and XOR 363 XORs the input state $S_3$ 303 and message index i+3 313. The outputs of the XORs 360, 361, 362, and 363 provide the inputs to the block ciphers 350, 352, 354, and 356 respectively. An XOR 351 XORs block $M_i$ 340, block $M_{i-4}$ 340, $x \cdot M_{i-7}$ 340, $x^3 \cdot M_{i-9}$ 340, and $\overline{S}_0$ 305, which is then input as the key to the block cipher 350. Likewise, an XOR 353 XORs block $M_{i+1}$ 341, block $M_{i-3}$ 341, $x \cdot M_{i-6}$ 341, $x^3 \cdot M_{i-12}$ 341, and $\overline{S}_1$ 306, which is then input as the key to the block cipher 352. Further, an XOR 355 XORs block $M_{i+2}$ 342, block $M_{i-2}$ 342, $x \cdot M_{i-5}$ 342, $x^3 \cdot M_{i-11}$ 342, and $\overline{S}_2$ 307, which is then input as the key to the block cipher 354. Also, an XOR 357 XORs block $M_{i+3}$ 343, block $M_{i-1}$ 343, $x \cdot M_{i-8}$ 343, $x^3 \cdot M_{i-10}$ 343, and $\overline{S}_3$ 308, which is then input as the key to the block cipher 356. An XOR 370 XORs the output of the block cipher 350 with the output of the XOR 360. An XOR 371 XORs the output of the block cipher 352 with the output of the XOR 361 and the output of the XOR 370. An XOR 372 XORs the output of the block cipher 354 with the output of the XOR 362 and the output of the XOR 371. An XOR 373 XORs the output of the block cipher 356 with the output of the XOR 363 and the output of the XOR 372. The output of XOR 373 is bit rotated by one bit 385 and becomes the new output state $S_3'$ 393. The XOR 380 XORs the new output state $S_3'$ 393 with the output of XOR 370 to produce the new output state $S_0'$, 390. The XOR 381 XORs the new output state $S_3'$ 393 with the output of XOR 371 to produce the new output state $S_1'$ 391. The XOR 382 XORs the new output state $S_3'$ 393 with the output of XOR 372 to produce the new output state $S_2'$ 392. The new output states $S_0'$, $S_1'$, $S_2'$, and $S_3'$ then become the inputs to the next round.

It can also be seen that if one uses for example AES-256, the rate is actually 2, but performance is not really doubled, because AES-256 needs 14 rounds instead of only 10 as AES-256.

For N>2 some primitive polynomials p(x) of degree k are needed which can be taken out of the following list for standard key sizes:

$x^{56} + x^7 + x^4 + x^2 + 1$ $x^{64} + x^4 + x^3 + x + 1$ $x^{72} + x^6 + x^4 + x^3 + x^2 + x + 1$ $x^{80}+x^7+x^5+x^3+x^2+x+1$
$x^{96}+x^7+x^6+x^4+x^3+x^2+1$
$x^{112}+x^8+x^6+x^3+x^2+x+1$
$x^{128}+x^7+x^2+x+1$
$x^{144}+x^7+x^4+x^2+1$
$x^{160}+x^5+x^3+x^2+1$
$x^{192}+x^8+x^6+x^4+x^3+x^2+1$
$x^{224}+x^8+x^7+x^5+x^4+x^2+1$
$x^{256}+x^{10}+x^5+x^2+1$

The multiplication by $x^{8(j)}$ can be easily implemented by a shift and then XORing the left most bits, that were shifted out of the "register" into some of the corresponding right most bits, like a CRC computation.

When a block cipher such as DES is used, it is a special case where k<b and hence $\overline{S}_t$ needs to be truncated. In this case security may be reduced.

Figure 4:
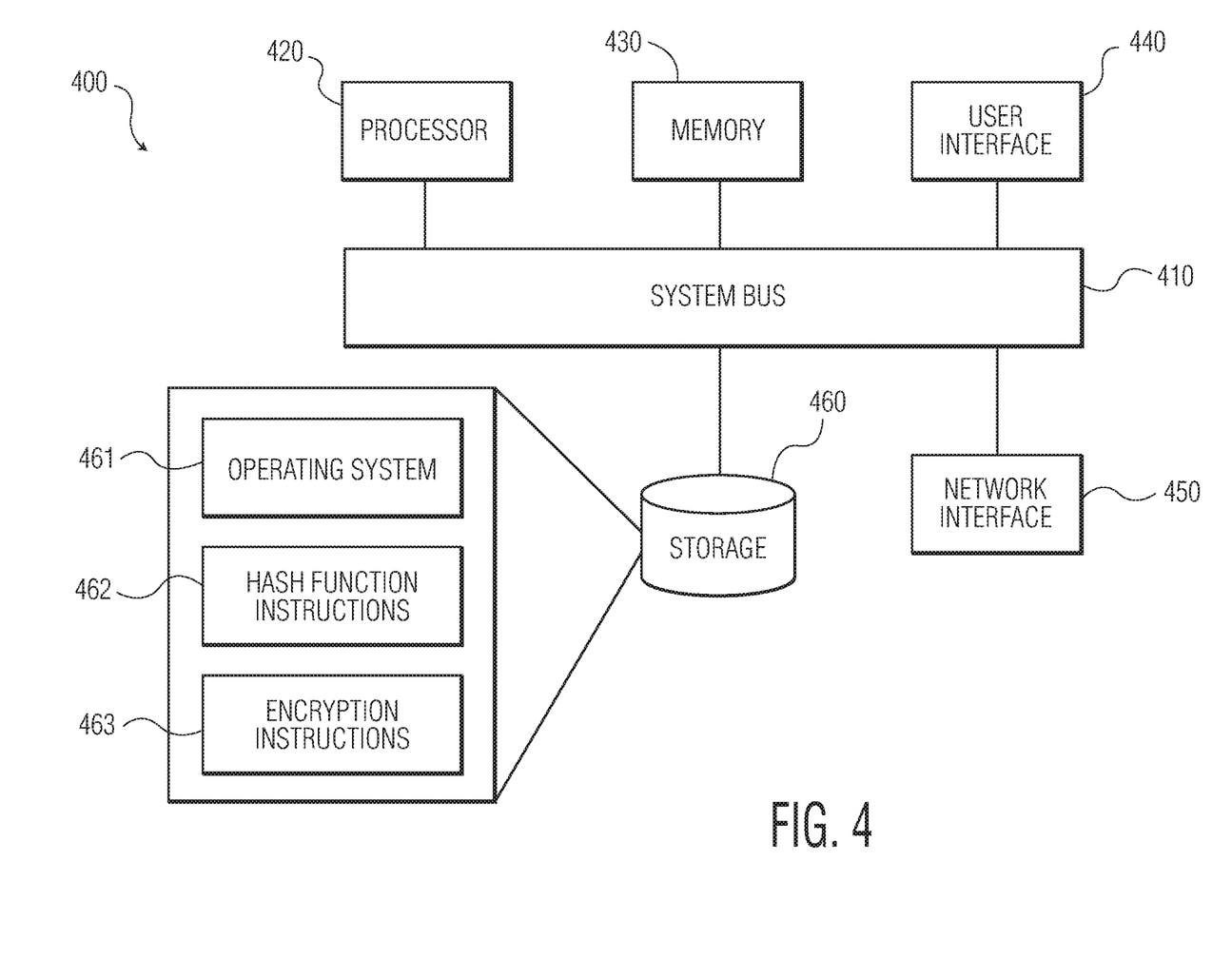
FIG. 4 illustrates an exemplary hardware diagram for implementing a cryptosystem according to the embodiments described above.

FIG. 4 illustrates an exemplary hardware diagram 400 for implementing a cryptosystem according to the embodiments described above. As shown, the device 400 includes a processor 420, memory 430, user interface 440, network interface 450, and storage 460 interconnected via one or more system buses 410. It will be understood that FIG. 4 constitutes, in some respects, an abstraction and that the actual organization of the components of the device 400 may be more complex than illustrated.

The processor 420 may be any hardware device capable of executing instructions stored in memory 430 or storage 460 or otherwise processing data. As such, the processor may include a microprocessor, field programmable gate array (FPGA), application-specific integrated circuit (ASIC), or other similar devices. In some embodiments, the processor 420 may be a secure processor.

The memory 430 may include various memories such as, for example L1, L2, or L3 cache or system memory. As such, the memory 430 may include static random access memory (SRAM), dynamic RAM (DRAM), flash memory, read only memory (ROM), or other similar memory devices.

The user interface 440 may include one or more devices for enabling communication with a user such as an administrator. For example, the user interface 440 may include a display, a mouse, and a keyboard for receiving user commands. In some embodiments, the user interface 440 may include a command line interface or graphical user interface that may be presented to a remote terminal via the network interface 450. In some embodiments, no user interface may be present.

The network interface 450 may include one or more devices for enabling communication with other hardware devices. For example, the network interface 450 may include a network interface card (NIC) configured to communicate according to the Ethernet protocol. Additionally, the network interface 450 may implement a TCP/IP stack for communication according to the TCP/IP protocols. Various alternative or additional hardware or configurations for the network interface 450 will be apparent.

The storage 460 may include one or more machine-readable storage media such as read-only memory (ROM), random-access memory (RAM), magnetic disk storage media, optical storage media, flash-memory devices, or similar storage media. In various embodiments, the storage 460 may store instructions for execution by the processor 420 or data upon with the processor 420 may operate. For example, the storage 460 may store a base operating system 461 for controlling various basic operations of the hardware 400. Further, software for the hash function 462, and block cipher 463 may be stored in the memory. This software may implement the various embodiments described above.

It will be apparent that various information described as stored in the storage 460 may be additionally or alternatively stored in the memory 430. In this respect, the memory 430 may also be considered to constitute a "storage device" and the storage 460 may be considered a "memory." Various other arrangements will be apparent. Further, the memory 430 and storage 460 may both be considered to be "non-transitory machine-readable media." As used herein, the term "non-transitory" will be understood to exclude transitory signals but to include all forms of storage, including both volatile and non-volatile memories. In some embodiments, the memory 430 and storage 460 may be secure memory or secure storage.

While the host device 400 is shown as including one of each described component, the various components may be duplicated in various embodiments. For example, the processor 420 may include multiple microprocessors that are configured to independently execute the methods described herein or are configured to perform steps or subroutines of the methods described herein such that the multiple processors cooperate to achieve the functionality described herein. Further, where the device 400 is implemented in a cloud computing system, the various hardware components may belong to separate physical systems. For example, the processor 420 may include a first processor in a first server and a second processor in a second server.

The embodiments described in FIGS. 1-3 may also be implemented completely in hardware, completely in software such as described in FIG. 4, or a combination of both hardware and software.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method of hashing a message M using a block cipher, comprising:
   producing N block cipher inputs by XORing message indices i, . . . i+N−1 respectively with state values $S_0, \ldots S_{N-1}$, wherein N is an integer greater than 1;
   producing N block cipher keys by XORing N different blocks of message M and at least one of state values $S_0, \ldots S_{N-1}$ for each of the N block cipher keys;
   encrypting the N block cipher inputs using the respective N block cipher keys to produce N block cipher outputs;
   combining the N block cipher outputs with N block cipher inputs to produce N block cipher combined outputs $T_t$, for t=0, . . . , N−1;
   calculating $Y_0 = T_0$;
   calculating $Y_t = Y_{t-1} \oplus T_t$, for t=1, . . . , N−1, calculating $S_{N-1}'=Y_{N-1}\lll a$, where a is a number of bits to rotate where $S_0', \ldots, S_{N-1}'$ are new state values; and calculating $S_t'=Y_t \oplus S_{N-1}'$, for $t=0, \ldots, N-2$.

2. The method of claim 1, wherein producing N block cipher keys by XORing N different blocks of message M and at least one of state values $S_0, \ldots S_{N-1}$ for each of the N block cipher keys, further includes:

calculating $X_t = \oplus_{j=0}^{N-1} M_{r \cdot N+(t+\delta(j))\% \ N-j \cdot N} \cdot x^{\delta(j)}$ mod p(x), for $t=0, \ldots, N-1$, where r is a round number and $\delta(j)=j \cdot (j-1)/2$ for $j>0$ and 0 for $j=0$ and p(x) is a primitive polynomial of degree k where k is the size in bits of the key for the block cipher;

calculating $\overline{S}_t = \oplus_{j \neq t} S_j$, zero padded to k bits, for $t=0, \ldots, N-1$; and calculating $X_t \oplus \overline{S}_t$ for $t=0, \ldots, N-1$ as the N block cipher keys.

3. The method of claim 2, wherein $\delta(j)$ is 0, 0, 1, 3 for $j=0, \ldots, 3$ for $N \leq 4$.

4. The method of claim 1, wherein $S_0, \ldots S_{N-1}$ are initialized to predefined values.

5. The method of claim 1, wherein
N=2,
a first block cipher key is $M_i \oplus M_{i-2} \oplus S_1$, and
a second block cipher key is $M_{i+1} \oplus M_{i-1} \oplus S_0$.

6. The method of claim 1, wherein
N=3,
a first block cipher key is $M_i \oplus M_{i-3} \oplus x \cdot M_{i-5} \oplus S_1 \oplus S_2$, and
a second block cipher key is $M_{i+1} \oplus M_{i-2} \oplus x \cdot M_{i-4} \oplus S_0 \oplus S_2$,
a third block cipher key is $M_{i+2} \oplus M_{i-1} \oplus x \cdot M_{i-6} \oplus S_0 \oplus S_1$.

7. The method of claim 1, wherein
N=4,
a first block cipher key is $M_i \oplus M_{i-4} \oplus x \cdot M_{i-7} \oplus x^3 \cdot M_{i-9} \oplus S_1 \oplus S_2 \oplus S_3$,
a second block cipher key is $M_{i+1} \oplus M_{i-3} \oplus x \cdot M_{i-6} \oplus x^3 \cdot M_{i-12} \oplus S_0 \oplus S_1 \oplus S_2 \oplus S_3$,
a third block cipher key is $M_{i+2} \oplus M_{i-2} \oplus x \cdot M_{i-5} \oplus x^3 \cdot M_{i-11} \oplus S_0 \oplus S_1 \oplus S_3$, and
a fourth block cipher key is $M_{i+3} \oplus M_{i-1} \oplus x \cdot M_{i-8} \oplus x^3 \cdot M_{i-10} \oplus S_0 \oplus S_1 \oplus S_2$.

8. A non-transitory machine-readable storage medium encoded with instructions for hashing a message M using a block cipher, the non-transitory machine-readable storage medium comprising:

instructions for producing N block cipher inputs by XORing message indices i, ... i+N-1 respectively with state values $S_0, \ldots S_{N-1}$, wherein N is an integer greater than 1;

instructions for producing N block cipher keys by XORing N different blocks of message M and at least one of state values $S_0, \ldots S_{N-1}$ for each of the N block cipher keys;

instructions for encrypting the N block cipher inputs using the respective N block cipher keys to produce N block cipher outputs;

instructions for combining the N block cipher outputs with N block cipher inputs to produce N block cipher combined outputs $T_t$, for $t=0, \ldots, N-1$;

instructions for calculating $Y_0=T_0$;

instructions for calculating $Y_t=Y_{t-1} \oplus T_t$, for $t=1, \ldots, N-1$, instructions for calculating $S_{N-1}'=Y_{N-1}\lll a$, where a is a number of bits to rotate where $S_0', \ldots, S_{N-1}'$ are new state values; and instructions for calculating $S_t'=Y_t \oplus S_{N-1}'$, for $t=0, \ldots, N-2$.

9. The non-transitory machine-readable storage medium of claim 8, wherein producing N block cipher keys by XORing N different blocks of message M and at least one of state values $S_0, \ldots S_{N-1}$ for each of the N block cipher keys, further includes:

instructions for calculating $X_t = \oplus_{j=0}^{N-1} M_{r \cdot N+(t+\delta(j))\% \ N-j \cdot N} \cdot x^{\delta(j)}$ mod p(x), for $t=0, \ldots, N-1$, where r is a round number and $\delta(j)=j \cdot (j-1)/2$ for $j>0$ and 0 for $j=0$ and p(x) is a primitive polynomial of degree k where k is the size in bits of the key for the block cipher;

calculating $\overline{S}_t = \oplus_{j \neq t} S_j$, zero padded to k bits, for $t=0, \ldots, N-1$; and calculating $X_t \oplus \overline{S}_t$ for $t=0, \ldots, N-1$ as the N block cipher keys.

10. The non-transitory machine-readable storage medium of claim 9, wherein $\delta(j)$ is 0, 0, 1, 3 for $j=0, \ldots, 3$ for $N \leq 4$.

11. The non-transitory machine-readable storage medium of claim 8, wherein $S_0, \ldots S_{N-1}$ are initialized to predefined values.

12. The non-transitory machine-readable storage medium of claim 8, wherein
N=2,
a first block cipher key is $M_i \oplus M_{i-2} \oplus S_1$, and
a second block cipher key is $M_{i+1} \oplus M_{i-1} \oplus S_0$.

13. The non-transitory machine-readable storage medium of claim 8, wherein
N=3,
a first block cipher key is $M_i \oplus M_{i-3} \oplus x \cdot M_{i-5} \oplus S_1 \oplus S_2$, and
a second block cipher key is $M_{i+1} M_{i-2} \oplus x \cdot M_{i-4} \oplus S_0 \oplus S_2$,
a third block cipher key is $M_{i+2} \oplus M_{i-1} \oplus x \cdot M_{i-6} \oplus S_0 \oplus S_1$.

14. The non-transitory machine-readable storage medium of claim 8, wherein
N=4,
a first block cipher key is $M_i \oplus M_{i-4} \oplus x \cdot M_{i-7} \oplus x^3 \cdot M_{i-9} \oplus S_1 \oplus S_2 \oplus S_3$,
a second block cipher key is $M_{i+1} \oplus M_{i-3} \oplus x \cdot M_{i-6} \oplus x^3 \cdot M_{i-12} \oplus S_0 \oplus S_2 \oplus S_3$,
a third block cipher key is $M_{i+2} \oplus M_{i-2} \oplus x \cdot M_{i-5} \oplus x^3 \cdot M_{i-11} \oplus S_0 \oplus S_1 \oplus S_3$, and
a fourth block cipher key is $M_{i+3} \oplus M_{i-1} \oplus x \cdot M_{i-8} \oplus x^3 \cdot M_{i-10} \oplus S_0 \oplus S_1 \oplus S_2$.

* * * * *